United States Patent
Bauman et al.

(10) Patent No.: US 10,655,690 B2
(45) Date of Patent: May 19, 2020

(54) CLUTCH WITH DRAG RING

(71) Applicant: Schaeffler Technologies AG & Co. KG, Herzogenaurach (DE)

(72) Inventors: Jeremiah Bauman, Orrville, OH (US); Alexander Reimchen, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 187 days.

(21) Appl. No.: 15/883,444

(22) Filed: Jan. 30, 2018

(65) Prior Publication Data
US 2018/0238405 A1 Aug. 23, 2018

Related U.S. Application Data

(60) Provisional application No. 62/461,609, filed on Feb. 21, 2017.

(51) Int. Cl.
*F16D 41/067* (2006.01)

(52) U.S. Cl.
CPC ................. *F16D 41/067* (2013.01)

(58) Field of Classification Search
CPC .............................. F16D 41/067; F16D 15/00
See application file for complete search history.

(56) References Cited

U.S. PATENT DOCUMENTS

| | | | |
|---|---|---|---|
| 5,195,604 A * | 3/1993 | Brockett | B60K 17/3505 180/244 |
| 8,157,069 B2 * | 4/2012 | Altmann | F16D 41/067 192/45.004 |
| 8,348,040 B2 * | 1/2013 | Smetana | F16D 41/185 192/108 |
| 8,813,930 B2 * | 8/2014 | Hsueh | F16D 41/067 192/110 B |
| 8,857,294 B2 * | 10/2014 | Brewer | F16D 27/10 192/38 |
| 8,919,513 B2 | 12/2014 | Heath et al. | |
| 9,885,393 B2 * | 2/2018 | Mori | F16D 41/067 |
| 10,364,853 B2 * | 7/2019 | Reimchen | F16D 41/064 |
| 2009/0003750 A1 * | 1/2009 | Chen | F16D 41/067 384/572 |

* cited by examiner

*Primary Examiner* — Tinh Dang
(74) *Attorney, Agent, or Firm* — Kevin Parks

(57) ABSTRACT

A drag ring for a clutch includes an axis, a circumferential surface extending about the axis and first and second pluralities of segments. The first plurality of segments includes first and second ends integrally joined with the circumferential surface and a first center segment protruding radially outward from the circumferential surface. The second plurality of segments includes third and fourth ends integrally joined with the circumferential surface and a second center segment protruding radially inward from the circumferential surface. In an example embodiment, the first and second pluralities of segments are circumferentially distributed about the circumferential surface. In an example embodiment, the circumferential surface includes first and second continuous edges with a distance therebetween. A circular line extending about the circumferential surface at a midpoint of the distance is interrupted by the first and second pluralities of segments.

19 Claims, 6 Drawing Sheets

CLUTCH WITH DRAG RING

FIELD

The invention relates generally to a clutch, and more specifically to a clutch with a drag ring.

BACKGROUND

Clutches are known. One example is shown in U.S. Pat. No. 8,919,513 titled BI-DIRECTIONAL OVERRUNNING CLUTCH HAVING SPLIT ROLL CAGE to Heath et al.

BRIEF SUMMARY

Example aspects broadly comprise a drag ring for a clutch including an axis, a circumferential surface extending about the axis and first and second pluralities of segments. The first plurality of segments includes first and second ends integrally joined with the circumferential surface and a first center segment protruding radially outward from the circumferential surface. The second plurality of segments includes third and fourth ends integrally joined with the circumferential surface and a second center segment protruding radially inward from the circumferential surface. In an example embodiment, the first and second pluralities of segments are circumferentially distributed about the circumferential surface. In an example embodiment, the circumferential surface includes first and second continuous edges with a distance therebetween. A circular line extending about the circumferential surface at a midpoint of the distance is interrupted by the first and second pluralities of segments.

In some example embodiments, the first and second ends are axially offset from one another. In an example embodiment, the circumferential surface includes first and second apertures on circumferentially opposite sides of each of the first plurality of segments. In some example embodiments, the third and fourth ends are axially offset from one another. In an example embodiment, the circumferential surface includes third and fourth apertures on circumferentially opposite sides of each of the second plurality of segments. In some example embodiments, the first and second ends are circumferentially offset from one another. In an example embodiment, the circumferential surface includes fifth and sixth apertures on axially opposite sides of each of the first plurality of segments. In an example embodiment, the first or second center segments have an arcuate shape. In an example embodiment, the second center segment has circumferentially offset radially extending surfaces.

Other example aspects broadly comprise a clutch assembly with an axis, a cage arranged for receiving a plurality of blocking elements, and a drag ring arranged to frictionally engage a housing for the clutch assembly and drivingly engage the cage. In an example embodiment, the cage has axially extending slot and the drag ring has a radially inwardly extending segment disposed in the slot. In an example embodiment, the clutch assembly includes the housing and a steel sleeve. The housing is manufactured from aluminum and the sleeve is fitted between the housing and the drag ring to prevent wear of the aluminum. In an example embodiment, the clutch assembly includes the housing and the drag ring is circumferentially encompassed by the housing.

In some example embodiments, the clutch assembly has an inner race, an outer race, and a plurality of blocking elements disposed in the cage and radially between the inner and outer races. In an example embodiment, at least one of the outer race and the inner race includes a ramped profile. In an example embodiment, the drag ring is axially offset from the outer race. In an example embodiment, the blocking elements are rollers or sprags. In an example embodiment, the outer race is arranged for torque transmission with a first shaft and the inner race is arranged for torque transmission with a second shaft, different from the first shaft.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
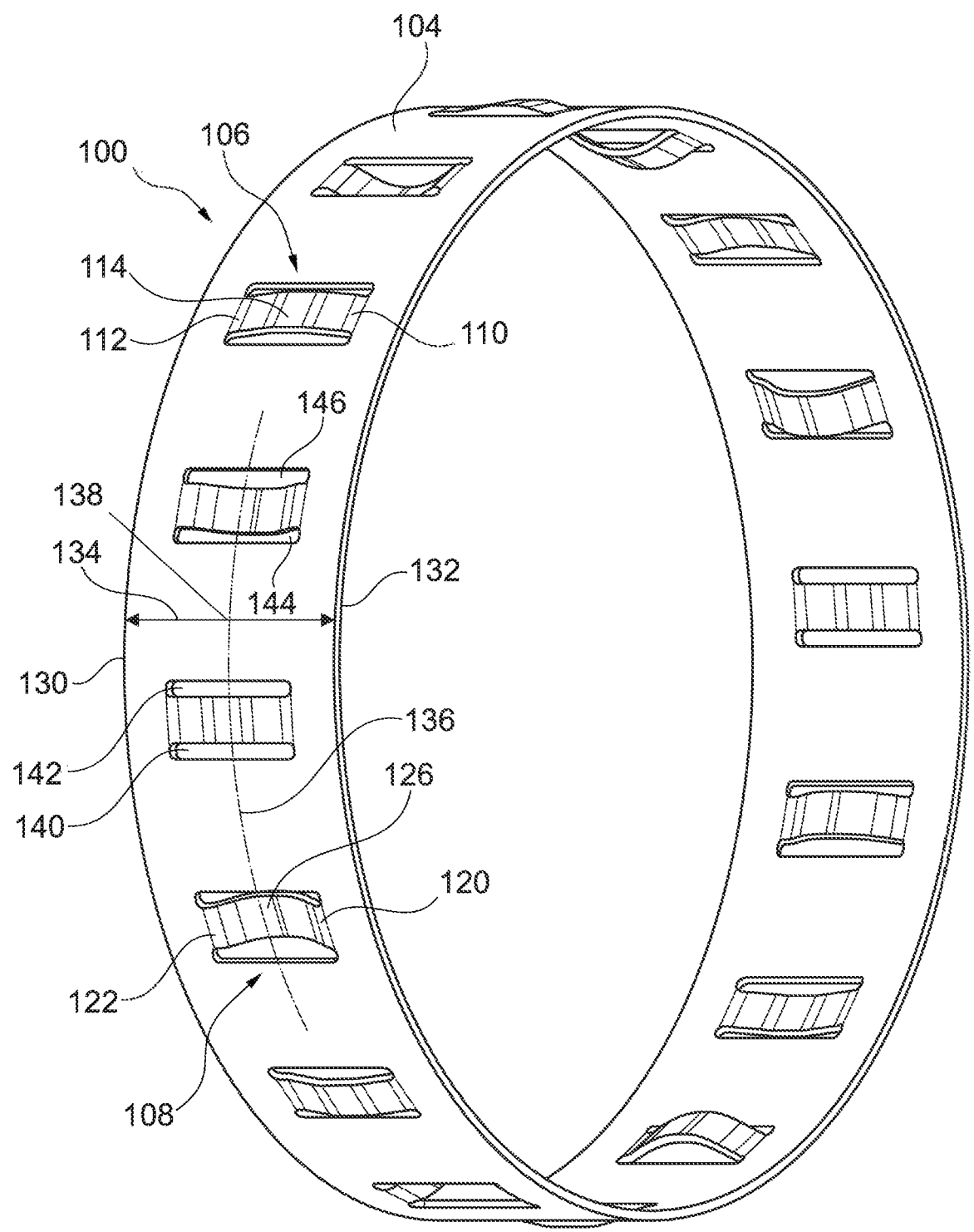
FIG. 1 is a perspective view of a drag ring according to an example aspect.
Figure 3:
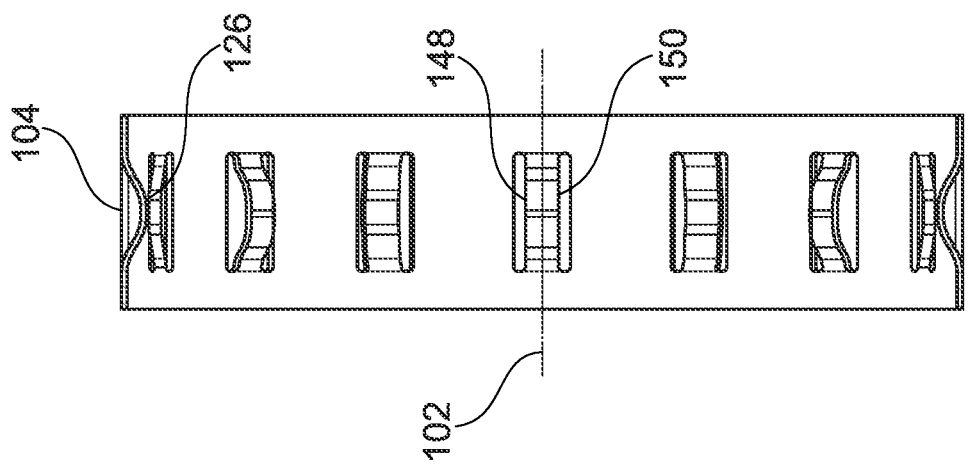
FIG. 3 is a section view of the drag ring of FIG. 1 taken generally along line 3-3 in FIG. 2.
Figure 2:
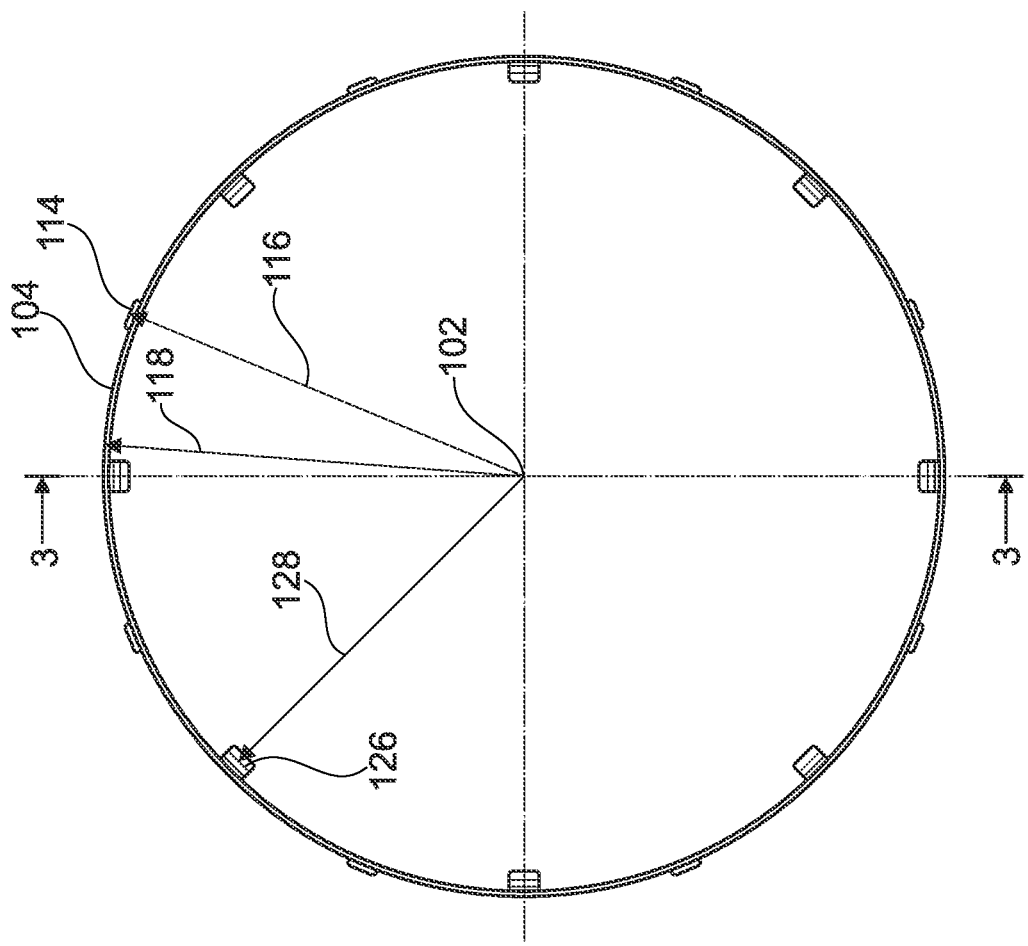
FIG. 2 is a front view of the drag ring of FIG. 1.

The following description is made with reference to FIGS. 1-3. FIG. 1 is a perspective view of drag ring 100 according to an example aspect. FIG. 2 is a front view of drag ring 100 of FIG. 1. FIG. 3 is a section view of drag ring 100 of FIG. 1 taken generally along line 3-3 in FIG. 2. Drag ring 100 includes axis 102, circumferential surface 104 extending about the axis, and segments 106 and 108. Segments 106 include ends 110 and 112 integrally joined with the circumferential surface and center segment 114 protruding radially outward from the circumferential surface. In other words, segment 114 extends further in radial direction 116 than a radius 118 of surface 104. Segments 108 include ends 120 and 122 integrally joined with the circumferential surface and center segment 126 protruding radially inward from the circumferential surface. In other words, segment 126 extends to a distance 128 less than radius 118 of surface 104.

Segments 106 and 108 are circumferentially distributed about the circumferential surface. Although segments 106 and 108 are shown alternative about surface 104, other configurations are possible. For example, there may be two segments 106 for each segment 108 or vice versa. Other multiples are possible as well. Circumferential surface 104 includes continuous edges 130 and 132 with distance 134 therebetween. Circular line 136 extending about the circumferential surface at midpoint 138 of the distance is interrupted by segments 106 and 108. In other words, line 136 of surface 104 is discontinuous. Ends 110 and 112 are axially offset from one another. Surface 104 includes apertures 140 and 142 on circumferentially opposite sides of segments 106. Ends 120 and 122 are axially offset from one another. Surface 104 includes apertures 144 and 146 on circumferentially opposite sides of segments 126. As best seen in FIG. 3, segments 126 have an arcuate shape. Segment 126 has circumferentially offset radially extending surfaces 148 and 150.

Figure 4:
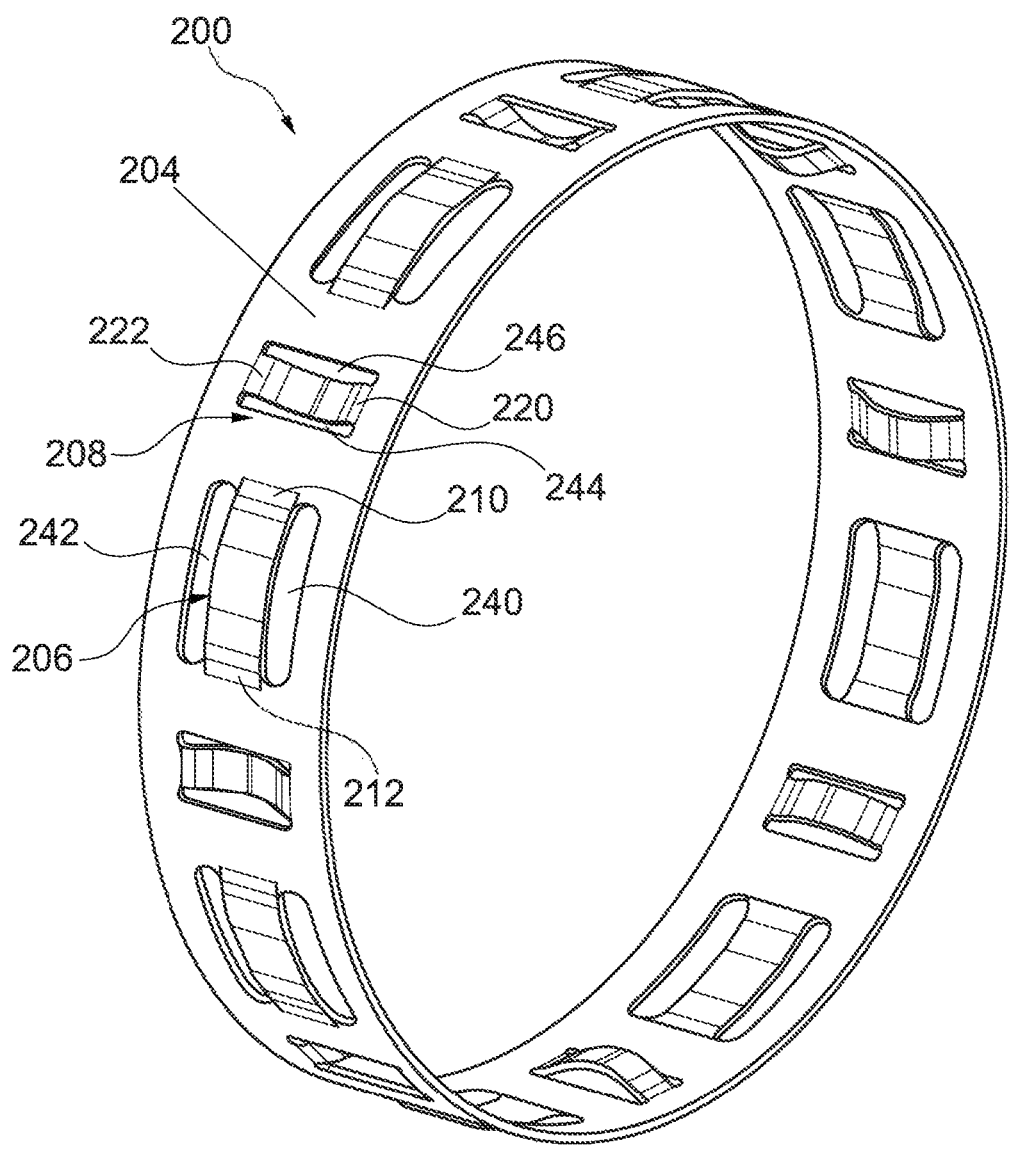
FIG. 4 is a perspective view of an alternative embodiment of the drag ring of FIG. 1 according to an example aspect.

The following description is made with reference to FIG. 4. FIG. 4 is a perspective view of alternative embodiment 200 of drag ring 100 of FIG. 1 according to an example aspect. Ends 220 and 222 of segment 208 are axially offset from one another. Surface 204 includes apertures 244 and 246 on circumferentially opposite sides of segments 208. Ends 210 and 212 of segment 206 are circumferentially offset from one another. Circumferential surface 204 includes apertures 240 and 242 on axially opposite sides of segments 206.

Figure 5:
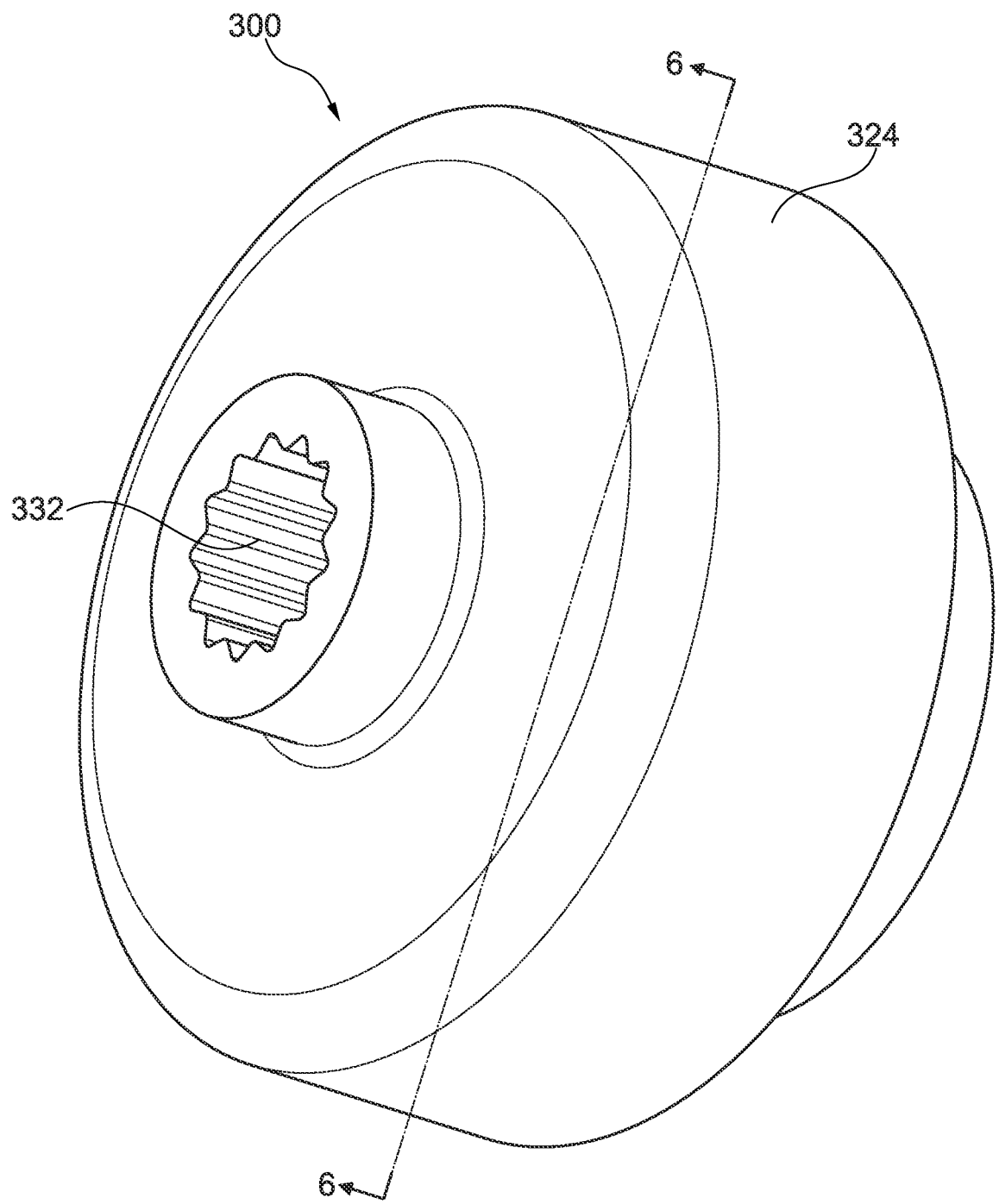
FIG. 5 is a perspective view of a clutch assembly including the drag ring of FIG. 1.
Figure 6:
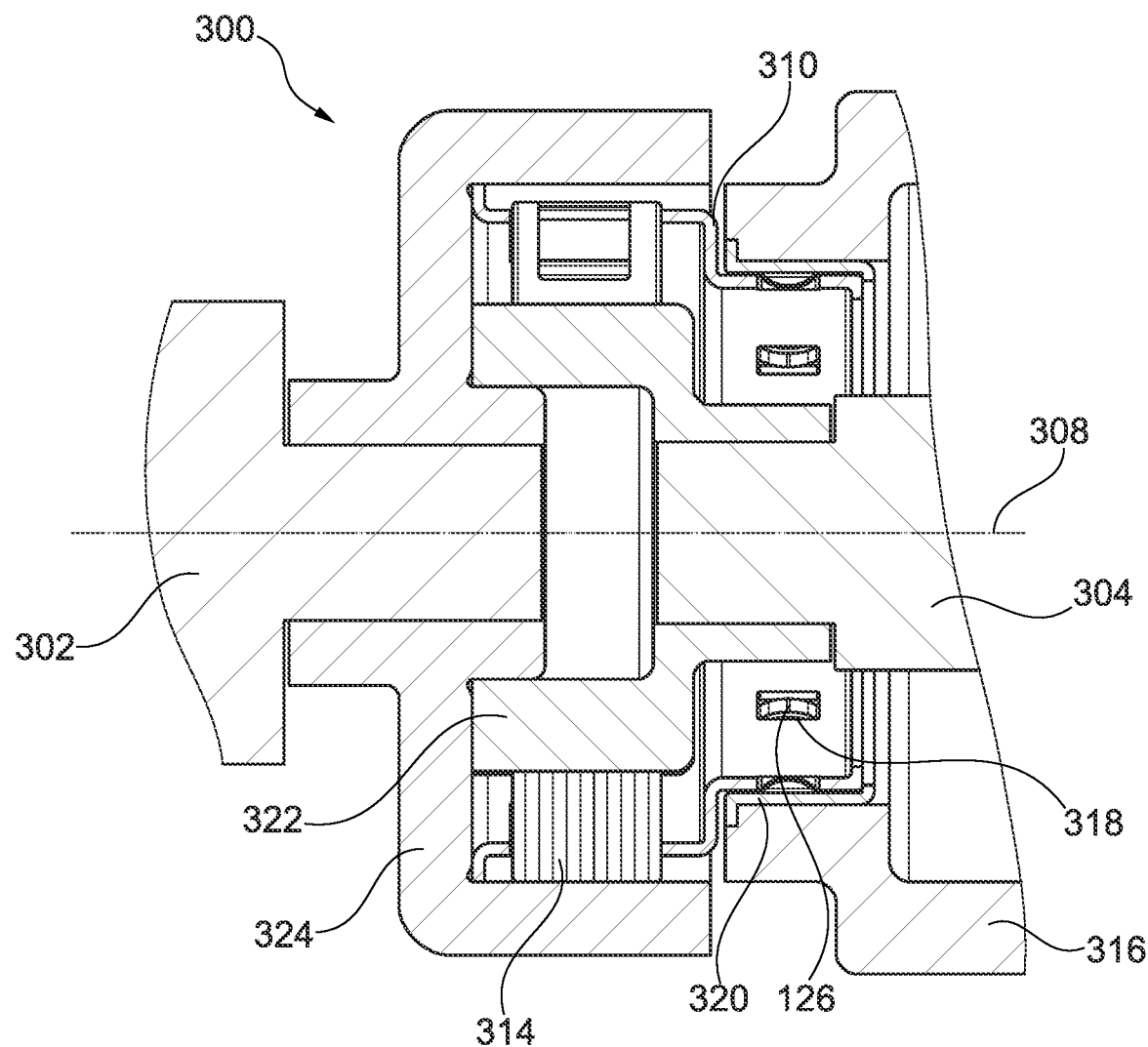
FIG. 6 is a partial section view of the clutch assembly of FIG. 5 taken generally along line 6-6 in FIG. 5 and shown with shafts and a housing.
Figure 7:
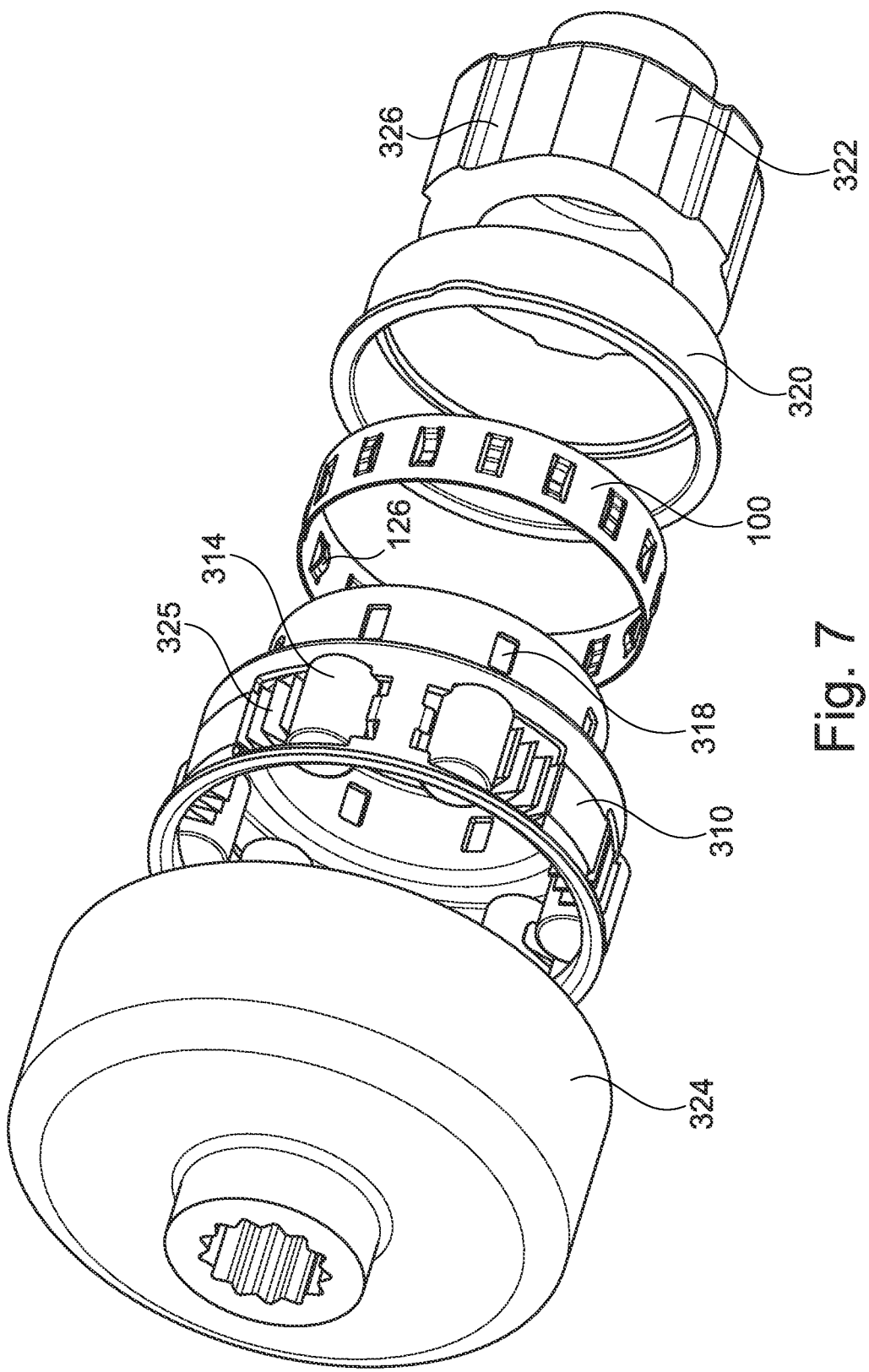
FIG. 7 is an exploded view of the clutch assembly of FIG. 5.

The following description is made with reference to FIGS. 5-7. FIG. 5 is a perspective view of clutch assembly 300 including drag ring 100 of FIG. 1. FIG. 6 is a partial section view of clutch assembly 300 of FIG. 5 taken generally along line 6-6 in FIG. 5 and shown with shafts 302 and 304, and housing 316. FIG. 7 is an exploded view of clutch assembly 300 of FIG. 5 Clutch assembly 300 includes axis 308, cage 310 and drag ring 100. Cage 310 is arranged for receiving blocking elements 314. Drag ring 100 is arranged to frictionally engage housing 316 and drivingly engage the cage as described below. Cage 310 has axially extending slot 318 and the drag ring has radially inwardly extending segment 126 disposed in the slot.

Clutch assembly 300 includes housing 316 and steel sleeve 320. The housing is manufactured from aluminum and the sleeve is fitted between the housing and the drag ring to prevent wear of the aluminum. Drag ring 100 is circumferentially encompassed by housing 316. Clutch assembly 300 includes inner race 322, outer race 324 and blocking elements 314 disposed in the cage and radially between the inner and outer races. Springs 325 help position elements 314 in cage 310. Inner race 322 includes ramped profile 326. Drag ring 100 is axially offset from the outer race. Blocking elements 314 are shown as rollers although other blocking elements (i.e., sprags) are possible. Outer race 324 is arranged for torque transmission with shaft 302 and inner race 322 is arranged for torque transmission with shaft 304. For example, outer race 324 includes spline 332 for driving engagement with a mating spline (not shown) on shaft 302.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A drag ring for a clutch comprising:
   an axis;
   a circumferential surface extending about the axis;
   a first plurality of segments including first and second ends integrally joined with the circumferential surface and a first center segment protruding radially outward from the circumferential surface; and,
   a second plurality of segments including third and fourth ends integrally joined with the circumferential surface and a second center segment protruding radially inward from the circumferential surface.

2. The drag ring of claim 1 wherein the first and second pluralities of segments are circumferentially distributed about the circumferential surface.

3. The drag ring of claim 1 wherein the circumferential surface includes first and second continuous edges with a distance therebetween, and a circular line extending about the circumferential surface at a midpoint of the distance is interrupted by the first and second pluralities of segments.

4. The drag ring of claim 1 wherein the first and second ends are axially offset from one another.

5. The drag ring of claim 4 wherein the circumferential surface comprises first and second apertures on circumferentially opposite sides of each of the first plurality of segments.

6. The drag ring of claim 1 wherein the third and fourth ends are axially offset from one another.

7. The drag ring of claim 6 wherein the circumferential surface comprises third and fourth apertures on circumferentially opposite sides of each of the second plurality of segments.

8. The drag ring of claim 1 wherein the first and second ends are circumferentially offset from one another.

9. The drag ring of claim 8 wherein the circumferential surface comprises fifth and sixth apertures on axially opposite sides of each of the first plurality of segments.

10. The drag ring of claim 1 wherein the first or second center segments have an arcuate shape.

11. The drag ring of claim 1 wherein the second center segment has circumferentially offset radially extending surfaces.

12. A clutch assembly comprising:
    an axis;
    a cage arranged for receiving a plurality of blocking elements; and,
    a drag ring arranged to frictionally engage a housing for the clutch assembly and drivingly engage the cage, wherein the cage has an axially extending slot and the drag ring has a radially inwardly extending segment disposed in the slot.

13. The clutch assembly of claim 12 further comprising:
    the housing; and,
    a steel sleeve, wherein the housing is manufactured from aluminum and the sleeve is fitted between the housing and the drag ring to reduce wear of the aluminum.

14. The clutch assembly of claim 12 further comprising the housing, wherein the drag ring is circumferentially encompassed by the housing.

15. The clutch assembly of claim 12 further comprising:
    an inner race;
    an outer race; and
    the plurality of blocking elements disposed in the cage and radially between the inner and outer races.

16. The clutch assembly of claim 15 wherein at least one of the outer race and the inner race includes a ramped profile.

17. The clutch assembly of claim 15 wherein the drag ring is axially offset from the outer race.

18. The clutch assembly of claim 15 wherein the blocking elements are rollers or sprags.

19. The clutch assembly of claim 15 wherein the outer race is arranged for torque transmission with a first shaft and the inner race is arranged for torque transmission with a second shaft, different from the first shaft.

\* \* \* \* \*